United States Patent [19]

Ayata et al.

[11] Patent Number: 4,527,885
[45] Date of Patent: Jul. 9, 1985

[54] IMAGE RECORDING SYSTEM HAVING MULTIPLE IMAGE RECORDING MEANS

[75] Inventors: Naoki Ayata, Machida; Seiji Saito, Yokosuka; Hidetoshi Suzuki; Kunitaka Ozawa, both of Tokyo; Noboru Koumura, Narashino, all of Japan

[73] Assignee: Canon Kabushiki Kaisha, Tokyo, Japan

[21] Appl. No.: 396,082

[22] Filed: Jul. 7, 1982

[30] Foreign Application Priority Data

Jul. 15, 1981 [JP] Japan .............................. 56-109290
Jul. 23, 1981 [JP] Japan .............................. 56-114350
Jul. 31, 1981 [JP] Japan .............................. 56-119160

[51] Int. Cl.³ .................. G03G 15/00; H04N 1/00
[52] U.S. Cl. .................................... 355/3 R; 358/256
[58] Field of Search ............ 355/3 R, 14 R, 14 C; 346/153.1, 160, 25, 33 A, 33 R; 360/15; 358/256, 286, 296, 300

[56] References Cited

U.S. PATENT DOCUMENTS

| 3,597,071 | 7/1971 | Jones ............................ 355/3 R |
| 4,099,860 | 7/1978 | Connin .......................... 355/14 C |
| 4,110,794 | 8/1978 | Lester et al. ................. 355/3 R X |
| 4,167,322 | 9/1979 | Yano et al. ..................... 355/3 R |
| 4,213,694 | 7/1980 | Kuseski ........................ 358/300 X |
| 4,251,153 | 2/1981 | Levine ........................... 355/3 R |
| 4,291,341 | 9/1981 | Yajima ........................ 355/14 R X |
| 4,383,277 | 5/1983 | Kubo ............................ 358/256 X |

FOREIGN PATENT DOCUMENTS 4058 1/1980 Japan .............................. 355/14 R
149956 11/1980 Japan .............................. 355/14 R

OTHER PUBLICATIONS

*Graphic Arts Monthly*, vol. 51, No. 5, May 1979, "Intelligent Copier Unifies Business Communication".

Primary Examiner—A. T. Grimley
Assistant Examiner—J. Pendegrass
Attorney, Agent, or Firm—Fitzpatrick, Cella, Harper & Scinto

[57] ABSTRACT

An image recording system comprises a plurality of image recording units that can selectively be driven to achieve most efficient operation. For example, the system may also include an input unit for entering image information and a control unit for selectively supplying image information entered by the input unit to at least one of the image recording units. In this case, the input unit further includes a display for indicating an operating condition of each of the recording units. As another example, the system may include a plurality of input units and a control device for detecting, during recording by all of the recording units, a new recording requirement and designating at least one of the recording units to interrupt its current recording operation and fulfill the new recording requirement. The system may also include a plurality of storage trays, for storing sheets on which recording has been performed by the recording units, in accordance with the one of the plurality of input means through which image information has been entered by the recording units.

21 Claims, 16 Drawing Figures

IMAGE RECORDING SYSTEM HAVING MULTIPLE IMAGE RECORDING MEANS

BACKGROUND OF THE INVENTION

1. Field of the Invention

The present invention relates to an image recording apparatus having plural image recording means, and more particularly to such image recording apparatus in which plural image recording means are controlled in response to image information from plural image information input units such as original image reading units.

2. Description of the Prior Art

The present applicants disclosed, in the U.S. Pat. No. 4,476,486, an image recording apparatus provided with an original image reading unit and plural image recording units. Such apparatus is capable of improving the efficiency of offices by creating plural copies from one reading of an original, and is also capable of simultaneously producing plural copies from the image information transmitted from a distant location if the original reading unit is positioned apart from the image recording units. In such image recording apparatus, however, the expensive recording units are inactive and their inclusion in the apparatus wasted most of the time if they are utilized only for recording the image information supplied from one image reading unit.

SUMMARY OF THE INVENTION

In consideration of the foregoing, the object of the present invention is to achieve effective utilization of an image recording apparatus having plural image recording means.

Another object of the present invention is to provide an image recording apparatus capable of image recording in response to image information from plural image information input units.

Still another object of the present invention is to provide an image recording apparatus in which plural recording means can be selected at the point of input of the image information.

Still another object of the present invention is to provide an image recording apparatus having recording means capable of recording preferentially the image information from a determined image information input unit.

Still another object of the present invention is to provide an image recording apparatus with plural recording means, wherein a certain recording means is allotted for recording image information supplied for example from an external image information input unit, thereby achieving efficient transmission of information.

Still another object of the present invention is to provide an image recording apparatus in which the functional status of plural recording means is easy to determine.

The foregoing and still other objects of the present invention will become fully apparent from the following description of the preferred embodiments.

DESCRIPTION OF THE PREFERRED EMBODIMENTS

Now the present invention will be explained in detail with reference to embodiments thereof shown in the attached drawings.

Figure 1:
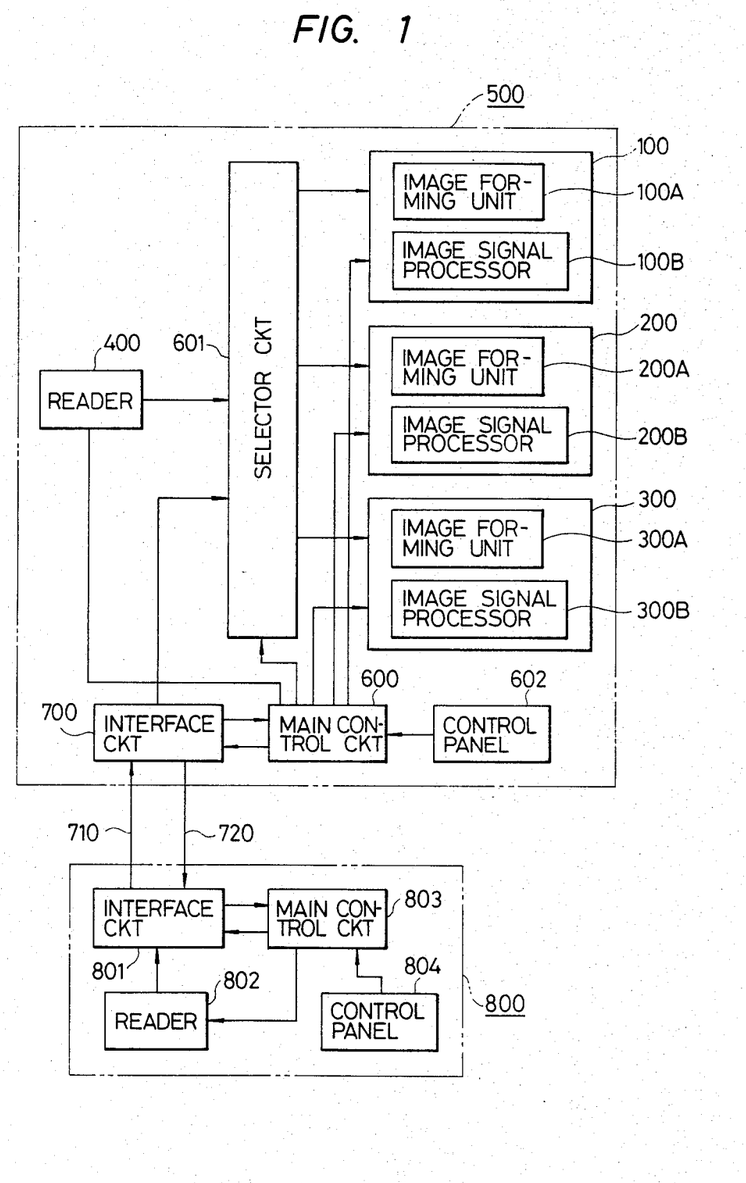
FIG. 1 is a block diagram showing a copying system embodying the present invention.

FIG. 1 is a block diagram of an image recording apparatus embodying the present invention, wherein a copying-recording apparatus 500 is provided with recorder units 100, 200 and 300 for image output and an original reader unit or reader 400 for image input. The recorder units 100, 200, 300 are composed of image forming units 100A, 200A, 300A and of image signal processing units or processors 100B, 200B, 300B, and are connected to the original reader unit 400 through a selector circuit 601 controlled by a main control circuit 600. An interface circuit 700 is connected, through signal lines 710 and 720, to another interface circuit 801 in a reading apparatus 800, which is further provided with an original reader unit or reader 802 similar to the reader unit 400 in the copying-recording apparatus 500 and with a main control circuit 803 for controlling the reader unit 802 and the interface circuit 801. Said copying-recording apparatus 500 and reading apparatus 800 are controlled by the keys in control panels 602 and 804.

Figure 2:
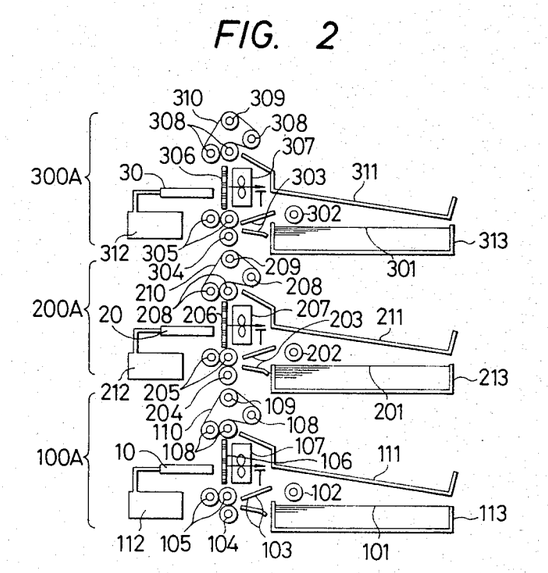
FIG. 2 is a lateral view showing an embodiment of the image forming unit thereof.

FIG. 2 shows an example of the image forming units 100A, 200A, 300A in the recorder units 100, 200, 300, wherein each of the image forming units 100A, 200A, 300A is provided for example with a full-line ink jet recording head having plural recording elements linearly arranged in a direction perpendicular to the plane of FIG. 2 at least over the width of a recording sheet as disclosed in detail in the preceding U.S. patent application Ser. No. 133,327, now U.S. Pat. No. 4,463,359, of the present applicant. The recorder units perform recording operations in response to electric signals from an unrepresented information source and are vertically stacked by unrepresented support members. In the present embodiment the image forming units are assumed to be of an identical structure. The image forming units naturally may be arranged horizontally, though such arrangement will require a larger space.

Recording sheets 101, 201, 301 of a determined size are dividedly stacked in cassettes 113, 213 and 313. There are further provided feed rollers 102, 202, 302; guide plates 103, 203, 303; registering rollers 104, 204, 304; first transport rollers 105, 205, 305; perforated platens 106, 206, 306; fans 107, 207, 307; second transport rollers 108, 208, 308; support rollers 109, 209, 309; conveyor belts 110, 210, 310; sheet trays 111, 211, 311; and ink tanks 112, 212, 312 for storing ink to be supplied to recording heads 10, 20, 30.

Now there will be given an explanation on the recording function of the image forming unit 100A which is structured identically and functions therefore in the same manner as the other units 200A and 300A.

A recording sheet 101 is extracted, one at a time, from the uppermost part of the sheet stack in the cassette 113 by the feed roller 102, then is advanced along the guide plates 103 and impinges upon the stopped registering roller 104, thereby forming a loop in front of the roller 104. Subsequently, in response to the start of rotation of the registering roller 104 in synchronism with the function of the ink jet head 10, the recording sheet 101 is advanced between said registering roller 104 and the first transport rollers 105 toward the ink jet head 10. Positioned in front of the head are the perforated platen 106 and the fan 107 for blowing the air in a direction T, so that the recording sheet advanced from the first transport rollers 105 proceeds in contact with the platen 106, under suction by said fan 107, toward the second transport rollers 108. Recording is performed on the recording sheet, during the passage on the platen 106, by the ink jet head driven by a driver circuit in response to electric signals from the unrepresented information source. Thereafter the second transport rollers 108 and the conveyor belt 110 cooperate to eject the recording sheet onto the sheet tray 111 with the recorded face upward.

Figure 3:
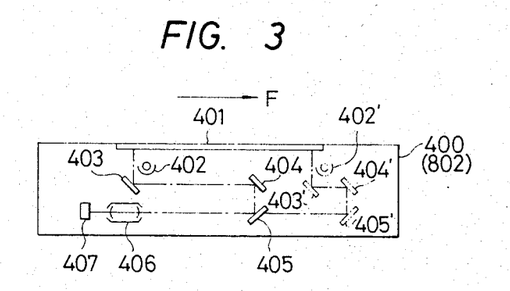
FIG. 3 is a lateral view showing an example of the reader in said system.

FIG. 3 schematically shows the reader unit 400 or 802 for image input into the copying-recording apparatus 500 or reading apparatus 800, as comprising a original carriage glass 401, a linear light source 402 such as a halogen lamp or a fluorescent lamp, a first mirror 403, a second mirror 404, a third mirror 405, a lens 406, and a linear solid-state image sensor 407 for example composed of a charge-coupled device (CCD).

An original document placed, with the image thereon facing downwardly, on the carriage glass 401 is illuminated by the light source 402. The reflected light is directed by the first, second and third mirrors 403, 404, 405 performing subsidiary scanning movements, and is focused through the lens 406 onto the CCD 407 which is so positioned as to perform main scanning in a direction perpendicular to the plane of FIG. 3. The light source 402 and the first mirror 403 are made as an integral unit by an unrepresented support member and are moved at a determined speed in a direction F along unrepresented guide rails to perform subsidiary scanning of the original image. Also the second and third mirrors 404, 405 are made as an integral unit by an unrepresented support member and are moved along unrepresented guide rails in the same direction as but with half of the speed of displacement of the first mirror 403. As the result of such subsidiary scanning movements, the light source 402, first mirror 403, second mirror 404 and third mirror 405 respectively arrive at broken-lined positions 402', 403', 404' and 405'. The optical path length from the carriage glass 401 to the lens 406 through the mirrors 403, 404 and 405 is maintained constant throughout the scanning motion. Consequently time-sequential signals corresponding to the raster scanning of the original image can be obtained by appropriately reading the signals from the CCD 407 during the subsidiary scanning motion.

Figure 4:
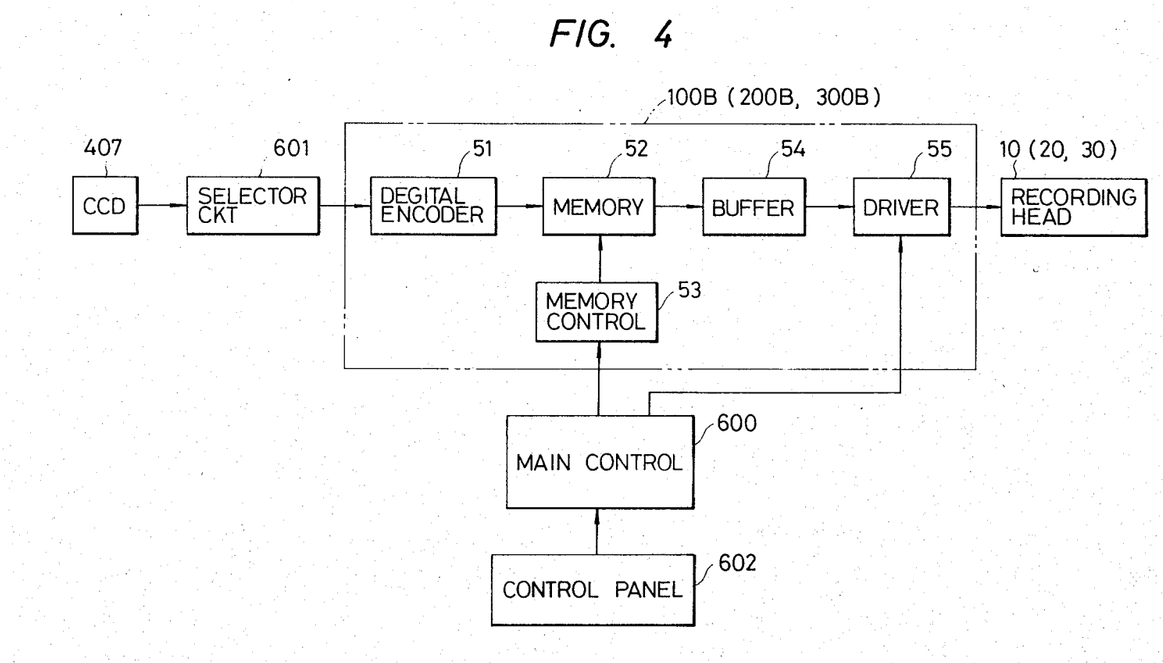
FIG. 4 is a block diagram showing an example of the image signal processing unit in said system.

FIG. 4 is a block diagram of an example of the image signal processing unit 100B of the recorder unit 100, wherein the same components as those in FIGS. 1 to 3 are represented by same numbers.

The CCD 407 in the reader unit 400 or 802 is provided with image reading elements of a number at least corresponding to the recording density of the ink jet head 10. A digital encoding circuit or encodes 51 converts the image signals from the CCD 407 into binary signals. A memory 52, for example composed of a semiconductor random access memory stores the image signals from the digital encoding circuit 51. The capacity of the memory 52 may be arbitrarily selected from about one line to plural pages, so that the image signals may be recorded simultaneously with image reading or after images of one or several pages are read and temporarily stored in the memory 52. A memory control circuit 53 releases the address signals, timing signals, read-write signals etc. for the memory 52 under the control by the main control circuit 600 according to the key instructions given by the operator through the control panel 602. A buffer circuit 54 supplies the image signals from the memory 52 to a driver circuit 55 in synchronism with the recording function of the ink jet head 10, and the driver circuit 55 is turned on and off by the main control circuit 600 and drives the ink jet head in the turned-on state in response to the image signals supplied from said buffer circuit.

Figure 5A:
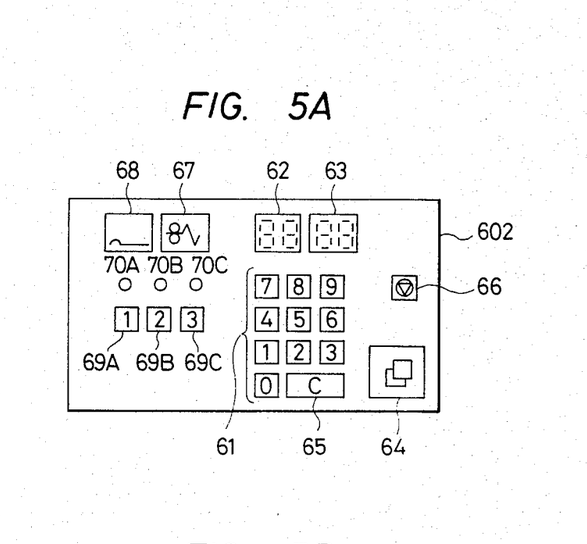
FIGS. 5A and 5B are plan views showing examples of the control panel in said system.
Figure 5B:
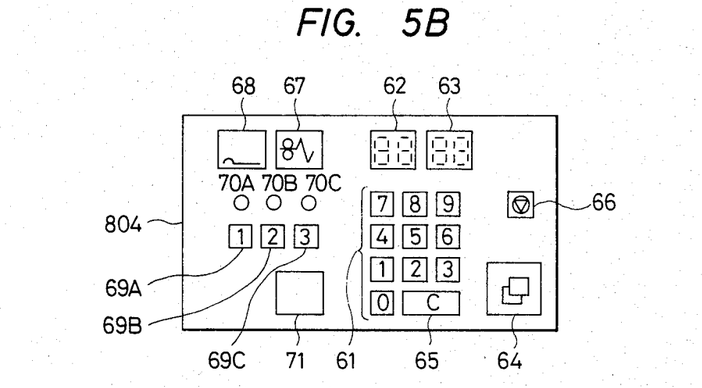

FIGS. 5A and 5B show examples of the control panels 602 and 804, wherein provided are numeral keys 61 for entering a desired number of recordings; a set indicator 62 for displaying the number entered by said numeral keys 61; a count indicator 63 for displaying the number of already recorded sheets and adapted for displaying the number of sheets recorded in the first selected recorder unit in case plural recorders are selected; a recording button 64 for starting the recording operation; a clear key 65 for cancelling the entry by the numeral keys 65; a stop key 66 for interrupting the recording operation; a jam indicator 67 for indicating a sheet jam in the selected recorder unit; a paper indicator 68 for indicating the lack of recording sheets in the cassette of the selected recording unit; selector keys 69A–69C for selecting the recorder units 100, 200, 300; and indicator lamps 70A–70C positioned above these keys to indicate the selected recorder unit. In the control panel 804 of the reading apparatus 800 shown in FIG. 5B, in response to the actuation of a check key 71 for checking the state of the copying-recording apparatus 500, the indicator lamps 70A–70C corresponding to the available recorder units are intermittently lighted. Consequently the operator of the reading apparatus 800 can inspect the status of the recorder units in the copying-recording apparatus 500 by actuating the check key 71. Said intermittent lighting is terminated upon actuation of a selector key, an indicator lamp corresponding to the selected recorder unit is continuously lighted. Said indicator lamps 70A–70C may also be utilized for indicating that recorder unit is not serviceable because, for example, of a failure such as sheet jamming or inadequate ink supply. Furthermore the selector keys 69A–69C may be used to select two or more recorder units.

Figure 6:
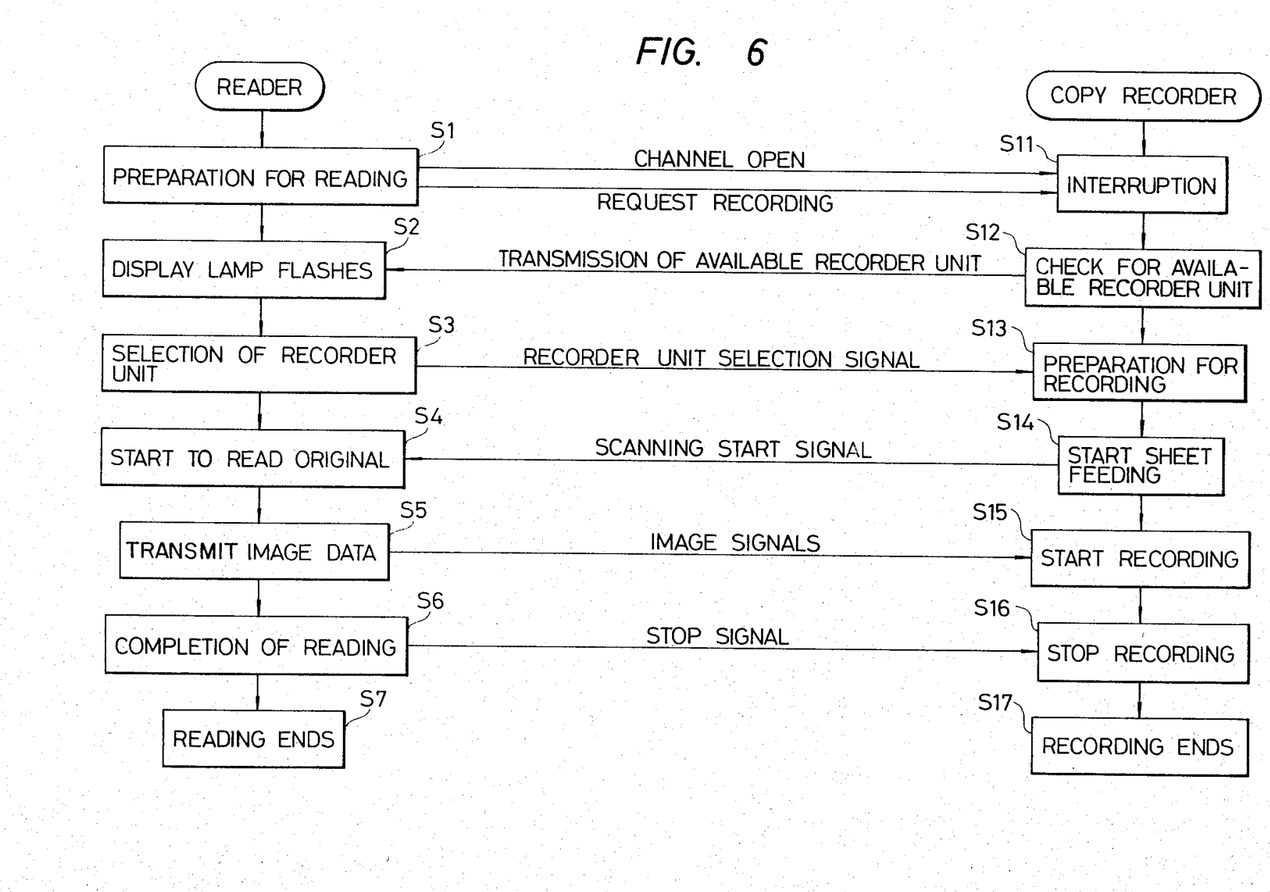
FIG. 6 is a control flow chart showing an example of the control sequence in said copying system.

The function of the recording system described above will now be explained, with reference to the flow chart shown in FIG. 6.

In the following it is assumed that the image signals obtained in the reading apparatus 800 are transmitted to the copying-recording apparatus 500 for recording therein.

In the step S1, the operator places an original document on the carriage glass 401 in preparation for reading and actuates the check key 71 for inspecting the status of the copying-recording apparatus 500. The main control circuits 803, 600 of the reading apparatus 800 and the copying-recording apparatus 500 are mutually connected through the signal lines 710 and 720 and an interruption signal is given to said main control circuit 600 of the copying-recording apparatus 500 in the step S11. In response to said interruption signal, the main control circuit 600 sequentially executes the steps S11-S17 in the following manner. At first step S12 is executed to check the status of the recorder units, for example by inspecting the status of a random access memory provided in the main control circuit 600 for indicating the status of use of the recorder units 100, 200 and 300. In response to a signal indicating the available recorder unit, for example the recorder unit 100, transmitted from the main control circuit 600 to the reading apparatus 800, the display lamp 70A of the control panel 804 shown in FIG. 5B is intermittently lighted in the step S2 to indicate that recorder unit 100 is available for use. In the step S3, the operator actuates the selector key 69A for selecting said recorder unit 100, whereby the indicator lamp 70A ceases the intermittent lighting and is continuously lighted, and a recorder selection signal is transmitted to the main control circuit 600 through the signal line 710. In response to said signal the main control circuit 600 controls the selector circuit 601 in the step S13 for enabling the transmission of image signals from the interface circuit 700 to the recorder unit 100 through the selector circuit 601 and preparing the recorder unit 100 for image recording operation.

In the succeeding step S14, the main control circuit 600 starts an unrepresented sheet-feeding motor at a determined time, thereby initiating the sheet feeding from the cassette 113. At the same time a scanning start signal is transmitted to the reading apparatus 800. In response to this signal, the step S4 is executed to start scanning of the original on the carriage glass 401 with the CCD 407 under the control by the main control circuit 803, and the obtained image signals are sequentially transmitted to the copying-recording apparatus 500 in the step S5. In the succeeding step S15, the image signals transmitted to the signal processing unit 100B of the recorder unit 100 through the interface circuit 801, signal line 710, interface circuit 700 and selector circuit 601 are processed in the aforementioned manner, thus recording the image on the recording sheet.

Upon completion of the original reading by the CCD 407, the step S6 is executed to transmit a stop signal from the reading apparatus 800 to the copying-recording apparatus 500, whereby the recorder unit 100 terminates the recording operation in the step S16. Subsequently the reading apparatus 800 completes the reading procedure in the step S7, and the copying-recording apparatus 500 terminates the image recording in the recorder unit 100 of the image signals from the reading apparatus 800 in the step S17.

In the foregoing case, if the recorder units 200, 300 have been recording the signals from the reader unit 400 of the copying-recording apparatus 500 or from an unrepresented reading apparatus similar to the apparatus 800, such recording can be continued without interruption as the recorder units are made independently operable. Also in case all the recorder units are in use in the step S1, one of the indicator lamps 70A-70C is intermittently lighted when one of the recorder units becomes available upon completion of the recording operation therein, and such available recorder unit can be selected by the selector keys 69A-69C for performing the image recording in the above-explained manner.

As explained in the foregoing, the present invention allows efficient shared use of the image recording apparatus with plural recorder units among plural image signal input means. Also the working ratio of the copying-recording apparatus or of the entire copying system is increased, since the image signals from the image signal input unit such as a reader unit can be recorded by a recorder unit even while other recorder units are occupied. Furthermore the system is easily manipulable as the status of recorder units is readily identifiable even at a distant image signal input unit.

Although the foregoing explanation has been limited to the use of a reading apparatus only, it will be readily understood that the present invention is also applicable to the case of using two or more reading apparatus in combination with a copying-recording apparatus. It is furthermore possible to connect to the copying-recording apparatus other image information input means than the reading apparatus, such as word processors, office computers, signal reading devices for various recording media for example optical or magnetic recording media, in order to obtain recordings in response to image information.

Furthermore the recorder units may employ other recording methods than ink jet recording, for example electrostatic recording or thermal recording.

Another embodiment of the present invention is explained below.

In the aforementioned system, the recording of the information obtained in the reading apparatus can be achieved more smoothly if the copying-recording apparatus is provided with a recorder unit for preferentially or exclusively recording such information. In the present embodiment, therefore, at least one of the recorder units in the copying-recording apparatus is designated for preferentially recording the image signals to be supplied from a predetermined reading apparatus. More specifically, in the recording system shown in FIG. 1, the recorder unit 100 is selected for preferentially recording the image signals supplied from the reading apparatus 800, and the main control circuit 600 of the copying-recording apparatus 500 performs control in such a manner that the image signals are preferentially recorded in the recorder unit 100 in case the transmission of such signals is requested by the reading apparatus 800.

Figure 7A:
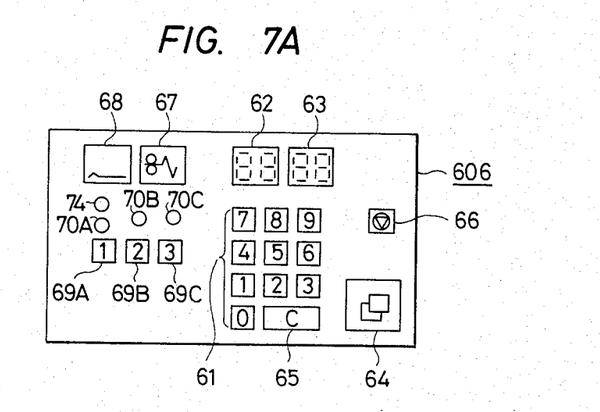
FIGS. 7A and 7B are plan views showing other examples of the control panel in said system.
Figure 7B:
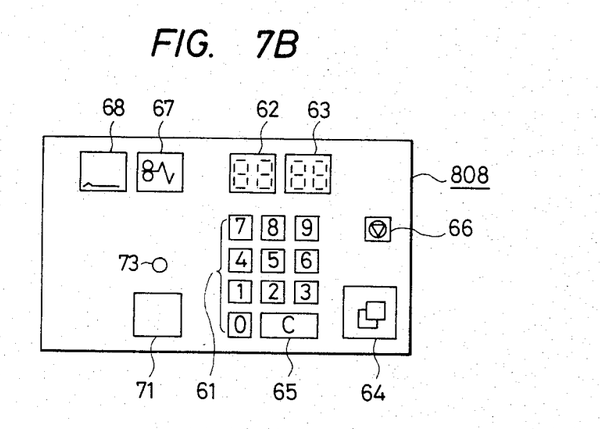

FIGS. 7A and 7B shown an example of control panels 606, 808, wherein the components having the same functions as those in FIGS. 5A and 5B are represented by same numbers and are omitted from the following explanation.

The control panel shown in FIG. 7A, different from the one shown in FIG. 5A, is additionally provided with an indicator lamp 74 for indicating that the recorder unit 100 is recording the image signals transmitted from the reading apparatus 800. Also the control panel shown in FIG. 7B is different from the one shown in FIG. 5B in that the former is additionally provided with a check key 71 and a corresponding indicator lamp 73 for checking the status of the recorder unit 100 of the copying-recording apparatus 500.

The indicator lamp 74 on the control panel 606 is intermittently lighted in response to an interruption signal from the reading apparatus 800, as long as such instruction for interruption is in force.

Also said indicator lamp 73 above the check key 71 on the control panel 808 is intermittently lighted if the recorder unit 100 is available for recording when the check key 71 is actuated. Consequently the operator of the reading apparatus 800 can confirm the availability of the recorder unit 100 in the copying-recording apparatus 500 by pressing the check key 71.

Figure 8:
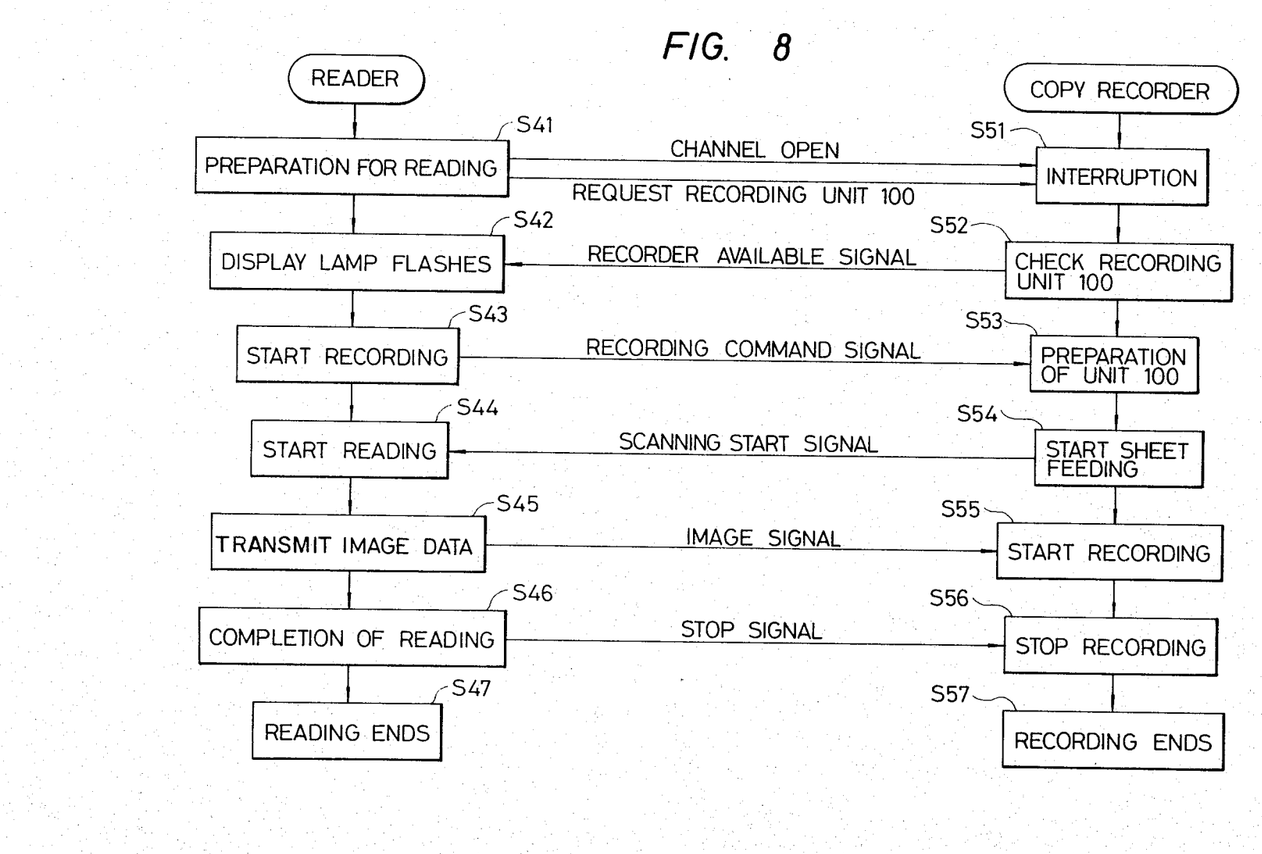
FIG. 8 is a control flow chart showing the control sequence of another embodiment.

Now reference is made to the flow chart shown in FIG. 8 for explaining the function of the above-explained recording system, in case of recording the image signals from the reading apparatus 800 by the preferential recorder unit in the copying-recording apparatus 500. It is to be noted that this function is same as that already explained with reference to FIG. 6 except in the selection of the recorder unit before the start of recording.

In the step S41, the operator places an original document on the carriage glass 401 and actuates the check key 71 in order to confirm the availability of the recorder unit 100 of the copying-recording apparatus 500. The main control circuits 803, 600 of the reading apparatus 800 and copying-recording apparatus 500 are mutually connected through the signal lines 710, 720, and an interruption signal is given to the main control circuit 600 of the copying-recording apparatus 500 in the step S51. In response to this interruption signal the main control circuit 600 executes the steps S52-S57 in the following manner. At first the step S52 is executed to confirm the availability of the recorder unit 100, for example by checking the status of a random access memory provided in the main control circuit 600 for indicating the status of recorder unit 100. If unit 100 is available for recording, the main control circuit 600 transmits a corresponding signal to the reading apparatus 800 to intermittently light the indicator lamp 73 of the control panel 804 shown in FIG. 7B in the step S42, thereby advising the operator that the recorder unit 100 is available for recording. In response to the actuation of the recording start signal by the operator in the step S43, a recording command signal is transmitted to the main control circuit 600 through the signal line 710, whereby the main control circuit 600 controls the selector circuit 601 in the step S53 so as to allow the transmission of image signals to the recorder unit 100 through said selector circuit 601, thereby preparing the recorder unit 100 for image recording.

In the subsequent step S54, the main control circuit 600 starts an unrepresented sheet-feeding motor in the recorder unit 100 for initiating sheet feeding from the cassette 113. At the same time a scanning start signal is transmitted to the reading apparatus 800, whereby the main control circuit 803 starts to read the original document on the carriage 401 with the CCD 407 in the step S44. In the subsequent step S45, the obtained image signals are sequentially transmitted to the copying-recording apparatus 500, whereby the image signals received by the signal processing unit 100B of the recorder unit 100 through the interface circuit 801, signal line 710, interface circuit 700 and selector circuit 601 are processed in the aforementioned manner in the step S55.

Upon completion of the signal reading by the CCD 407 in the step S46, the reading apparatus 800 transmits a stop signal to the copying-recording apparatus 500, whereby the recorder unit 100 terminates the recording operation in the step S56. In this manner the reading apparatus 800 terminates the entire reading procedure in the step S47, and the copying-recording apparatus 500 terminates the recording operation of the recorder unit 100 for the signals transmitted from the reading apparatus 800 in the step S57.

Figure 9:
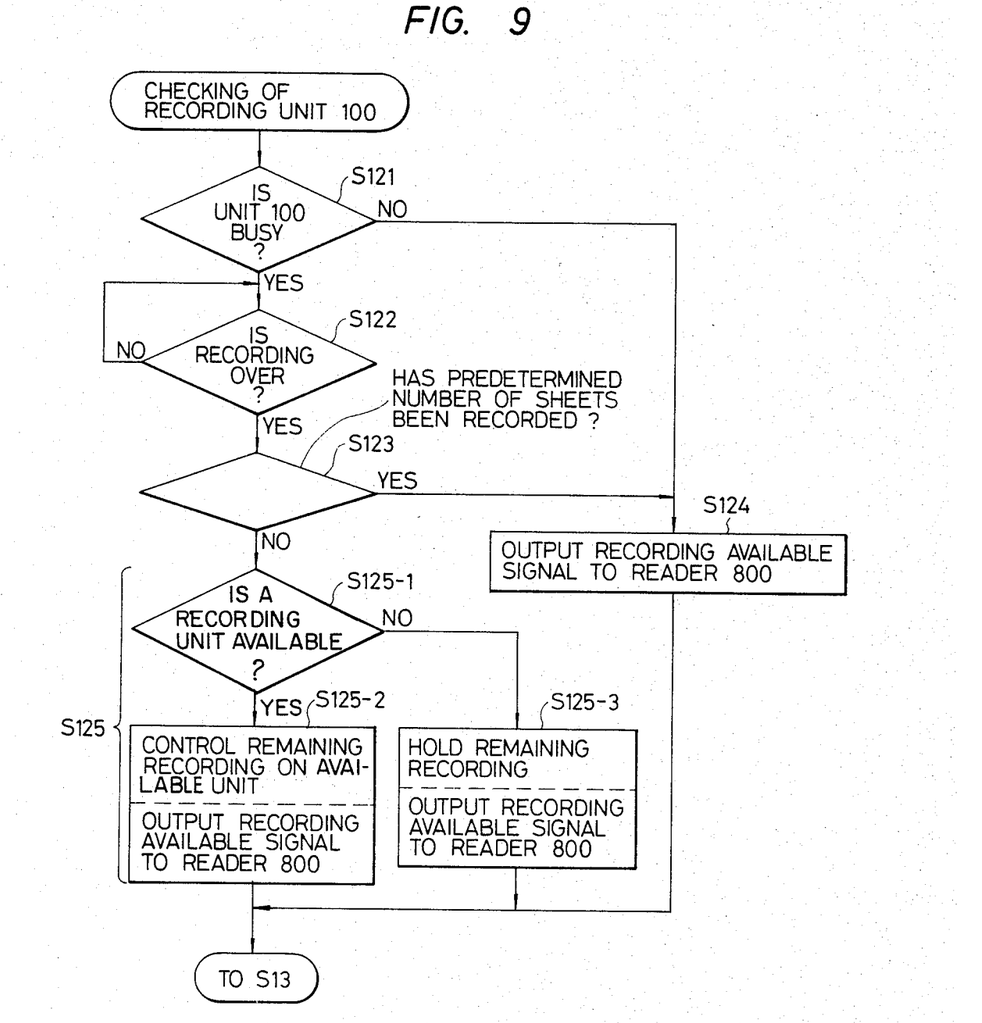
FIG. 9 is a detailed control flow chart showing the control procedure in the step S52 in FIG. 8.

An explanation will now be given of the procedure followed in the case in which the recorder unit is identified as occupied in the step S52. Reference is now made to FIG. 9 which explains step S52. In case the recorder unit 100 is found busy or occupied in the step S121, the program proceeds to the step S122 to await the completion of a recording cycle in progress. Upon completion of this recording cycle, the recording operation in the recorder unit 100 is temporarily interrupted and the step S123 is executed to identify if the recording of a predetermined number is completed. If so, the program proceeds along the 'YES' branch to the step S124 whereby the main control circuit 600 of the copying-recording apparatus 500 supplies the reading apparatus 800 with a recorder available signal indicating that the recorder unit 100 is now available. On the other hand, if the identification in the step S123 is negative, the program proceeds along the 'NO' branch to the step S125. At first the step S125-1 is executed to identify if any of the other recorder units 200, 300 is available for recording. If so, the program proceeds to the step S125-2 to perform control for recording the remaining copies in such available recorder unit and to provide the reading apparatus 800 with a recorder available signal indicating that the recorder unit 100 is available for recording. On the other hand, if the identification is negative, the program proceeds along the 'NO' branch to the step S125-3 to temporarily retain the number of remaining copies until a recorder unit becomes available and to provide the reading apparatus 800 with a recorder available signal. In this manner the recording operation in the recorder unit 100 is interrupted and the image signals transmitted from the reading apparatus 800 are recorded in recorder unit 100 according to the step S53 and the ensuing procedure shown in FIG. 8.

Figure 10:
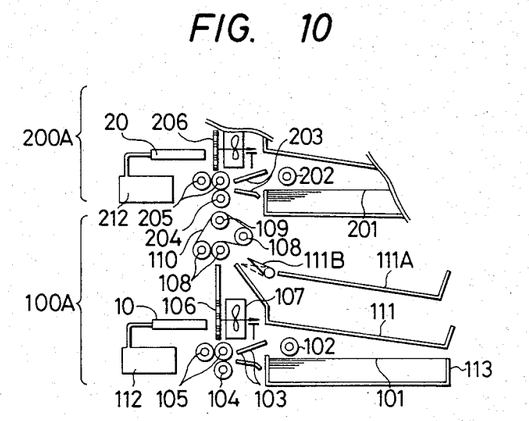
FIG. 10 is a partial lateral view showing the image forming unit 100A provided with two paper trays.

In the present embodiment wherein the recording unit 100 is selected for preferential recording of the image signals from the reading apparatus 800, the recording sheets ejected onto the tray 111 include those recorded before the entry of the interruption signal and those recorded thereafter and have to be sorted out afterwards in case such an interruption signal is entered while the recorder unit 100 is busy. Such inconvenience can however be avoided by an embodiment shown in FIG. 10 wherein the image forming unit 100A of the recorder unit 100 is equipped with an addition tray 111A exclusively for such recording during interruption and, to which the recording sheets for the image signals from the reading apparatus 800 are guided by a selector finger 111B controlled for example by an unrepresented plunger.

As explained in the foregoing, the present invention improves the efficiency of an operator of the reading apparatus having a reader unit only, in a recording system in which such reading apparatus is connected to a copying-recording apparatus having a reader unit and plural recorder units, since one of the recorder units is selected for preferentially recording the image signals from said reading apparatus thereby enabling immediate recording of said signals regardless of the status of the recorder units.

In this manner the recording apparatus with plural recording means can be shared by plural image information input means, and the smooth transmission of information can still be assured by selecting one of the recording means for preferentially recording the image information supplied from designated image information input means.

Also in the foregoing embodiment, the recording process is by no means limited to ink jet recording, and the image information may also be supplied from an office computer, a word processor or the like.

Furthermore it is possible to ensure improved efficiency of information transmission by selecting two or more recording means for such preferential recording.

Although the foregoing explanation has been made with reference to the use of a reading apparatus in combination with a copying-recording apparatus, the present invention is naturally applicable also to the case of two or more reading apparatus at the same time.

Still another embodiment of the present invention is described below. In this embodiment at least one of plural recorder units in the copying-recording apparatus is exclusively used for recording the image signals from a designated reading apparatus.

Figure 11:
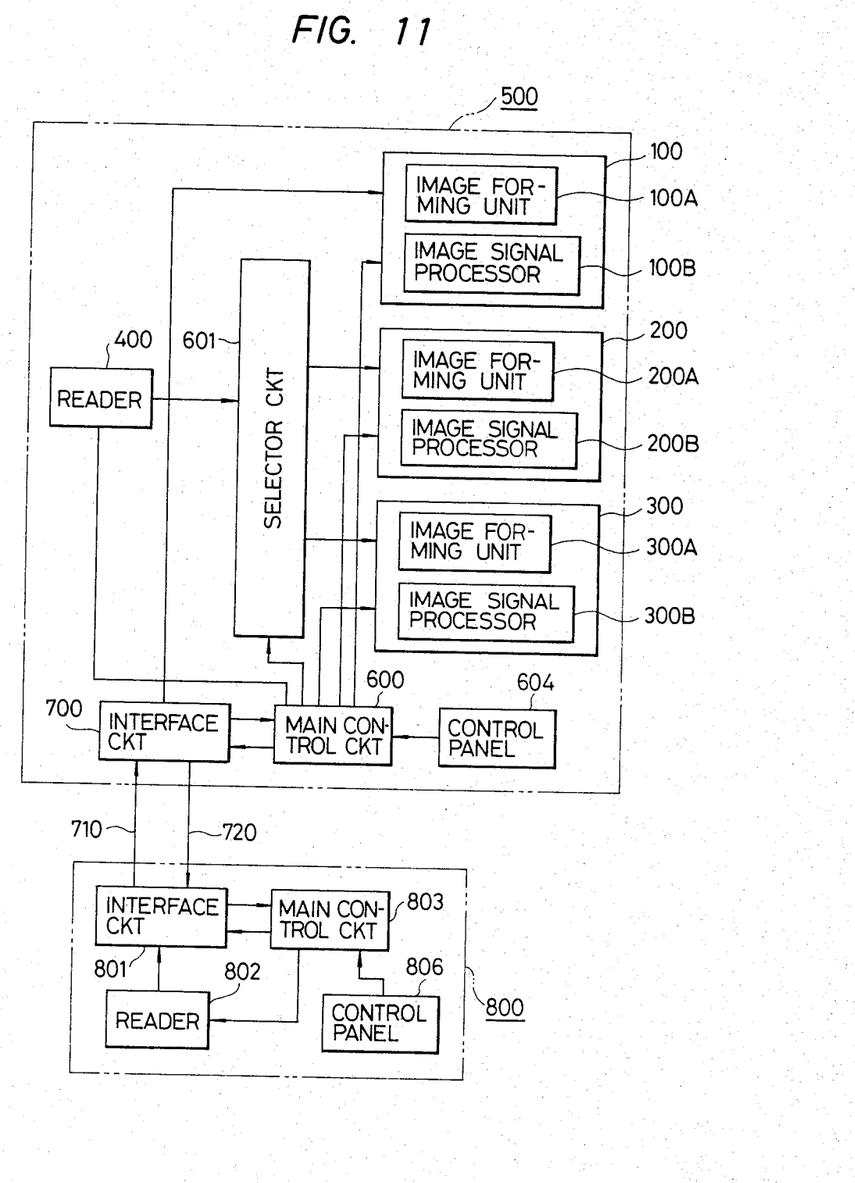
FIG. 11 is a block diagram showing still another embodiment of the present invention.

FIG. 11 is a block diagram of this embodiment, wherein the same components as those in FIG. 1 are represented by same numbers and description thereof is omitted from the following. The copying-recording apparatus 500 is provided with three recorder units 100, 200 and 300 in the same manner as shown in FIG. 1, but is different from the aforementioned embodiment in that the recorder units 200 and 300 are used for recording the image signals from the reader unit 400 through the selector circuit 601 controlled by the main control circuit 600 while the recorder unit 100 is directly connected to the interface circuit 700 which is connected through the signal lines 710, 720 to the interface circuit 801 of the reading apparatus 800 in order to record the image signals to be supplied from the reader unit 802.

The reader units 400, 802 photoelectrically read the original documents by means, for example, of a CCD explained in relation to FIG. 3, and the image forming units 100A, 200A, 300A of the recorder units perform image recording on the recording sheets, for example, by an ink jet process explained in relation to FIG. 2. Also each image processing unit is, for example, provided with the circuits shown in FIG. 4 in order to supply the received image signals to the recording head 10, 20 or 30 after determined signal processing.

Figure 12A:
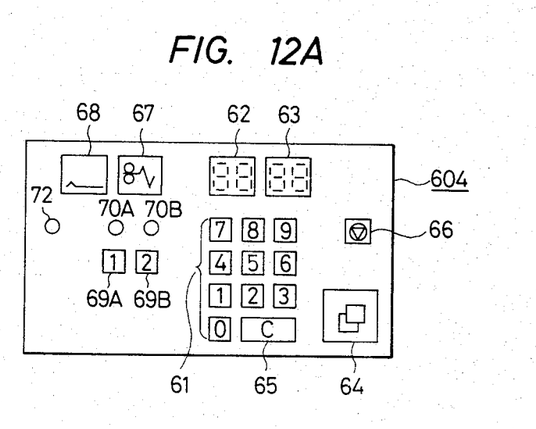
FIGS. 12A and 12B are plan views showing examples of the control panel in the embodiment shown in FIG. 11.
Figure 12B:
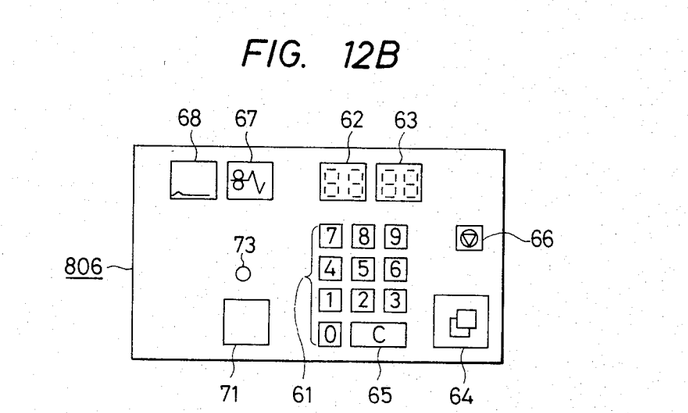

FIGS. 12A and 12B show an example of the control panels 604, 806 shown in FIG. 11, wherein the same components as those in FIGS. 5A and 5B are represented by the same numbers and description thereof is omitted from the following.

The control panel shown in FIG. 12A, different from that shown in FIG. 5A, is provided with two selector keys for selecting the recorder units 200 and 300, and an indicator lamp to be lighted or extinguished in response to turning the main power switch on or off. Such arrangement reflects the fact that the image signals from the reader unit 400 of the copying-recording apparatus 500 can be recorded solely by the recorder units 200 and 300. Also the control panel 806 of the reading apparatus 800 shown in FIG. 12B is different from that shown in FIG. 5B in that the former lacks the key for selecting the recorder units but is provided with a check key 71 and a corresponding indicator lamp 73 for inspecting the status of the recorder unit 100 exclusive for said reading apparatus 800. In response to the actuation of said check key 71, the indicator lamp 73 is intermittently lighted if the recorder unit 100 of the copying-recording apparatus 500 is available for recording, thus enabling the operator of the reading apparatus 800 to identify the availability of recorder unit 100.

Figure 13:
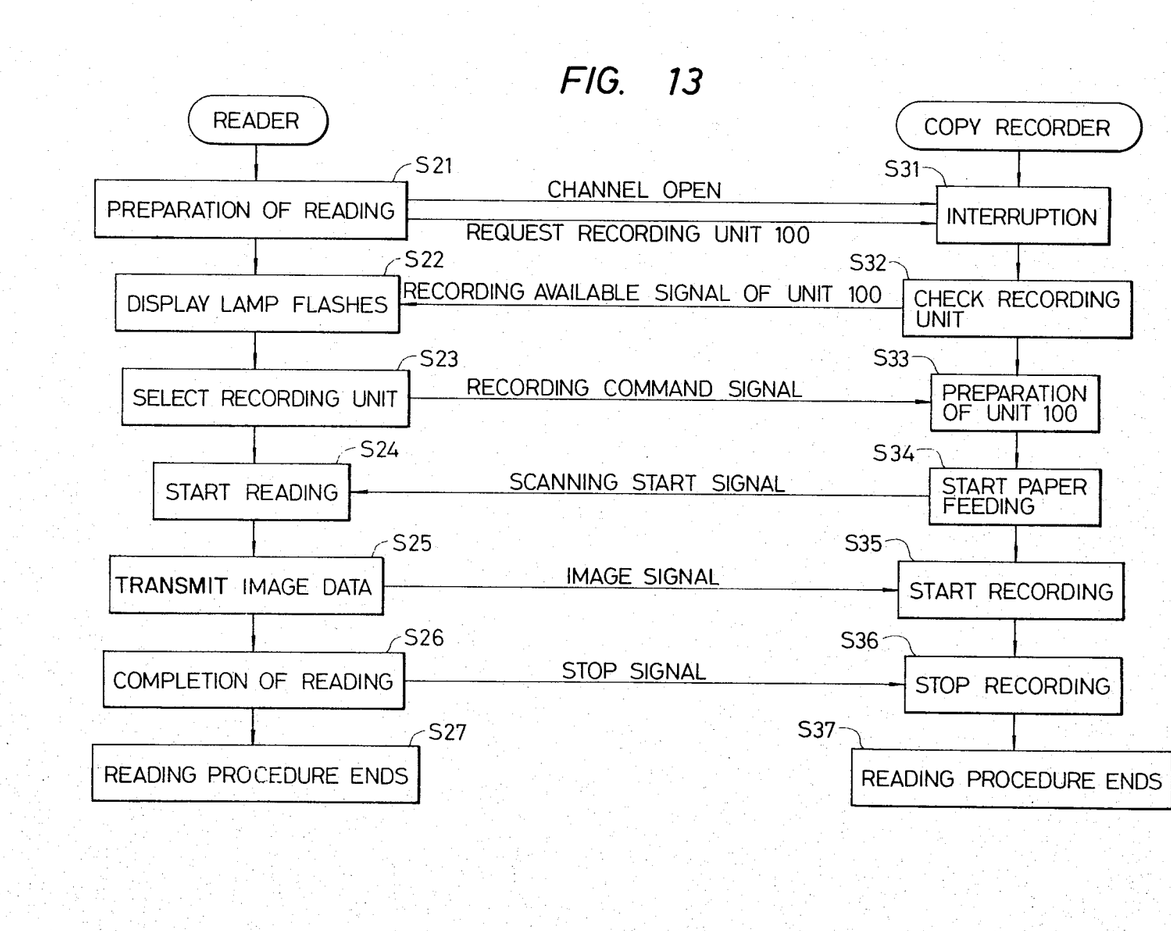
FIG. 13 is a control flow chart showing the control sequence of the embodiment shown in FIG. 11.

An explanation will now be given of the function of the above-explained recording system, with reference to the flow chart shown in FIG. 13, in case of recording image signals from the reading apparatus 800 by means of the exclusive recorder unit 100 in the copying-recording apparatus 500.

This function is identical with that already explained with reference to FIG. 6, except for the procedure of selecting the recorder unit before the start of recording.

At first in the step S21, the operator places an original document on the carriage glass 401 and actuates the check key 71 for confirming the availability of the recorder unit 100 of the copying-recording apparatus 500. The main control circuits 803, 600 of the reading apparatus 800 and copying-recording apparatus 500 are mutually connected through the signal lines 710, 720, and an interruption signal is supplied to the main control circuit 600 of the copying-recording apparatus 500 in the step S31. In response to this interruption signal, the main control circuit 600 executes the steps S32-S37 in the following manner. At first the step S32 is executed to identify the availability of the recorder unit 100, which might otherwise not be available because, for example, of the absence of recording sheets in the cassette or a sheet jam. In case the recorder unit 100 is available for recording, the main control circuit 600 transmits the recorder available signal to the reading apparatus 800 to intermittently light the indicator lamp 73 on the control panel 806 shown in FIG. 12B in the step S22. In response to the actuation of the recording button 64 by the operator in the step S23, a recording command signal is transmitted through the signal line 710 to the main control circuit 600 to prepare the recorder unit 100 in the step S33 for recording.

In response to this command signal, the main control circuit 600 starts, in the step S34, an unrepresented sheet-feed motor in the recorder unit 100 at a determined time, thereby feeding the recording sheet from the cassette 113. At the same time a scanning start signal is transmitted to the reading apparatus 800 whereby the main control circuit 803 starts, in the step S24, to read the original document on the carriage glass 401 by the CCD 407. In the succeeding step S25, the obtained image signals are sequentially transmitted to the copying-recording apparatus 500, whereby the signal processing unit 100B of the recorder unit 100 processes, in the step S35, the signals received through the interface circuit 801, signal line 710, and interface circuit 700 in the aforementioned manner.

Upon completion of the image reading by the CCD 407, the reading apparatus 800 transmits a stop signal to the copying-recording apparatus in the step S26, whereby the recorder unit 100 terminates the recording operation in the step S36. In this manner the reading apparatus 800 completes the entire reading procedure in the step S27, and the copying-recording apparatus 500 terminates, in the step S37, the recording of image signals in the recorder unit 100.

In the foregoing embodiment, the recording operation of the recorder units 200, 300 in response to the image signals from the reader unit 400 of the copying-recording apparatus 500 can be continued independently from the recording operation of the recorder unit 100.

As explained in the foregoing, the present invention improves the efficiency of the reading apparatus having only one reader unit, in a recording system in which such reading apparatus is connected to a copying-recording apparatus having a reader unit and plural recorder units, since the image information from said reading apparatus can be immediately recorded by a recorder unit exclusively used for such image information, regardless of the state of use of the copying-recording apparatus.

Although the foregoing explanation has been made with reference to the use of a reading apparatus, it is naturally possible according to the present invention to use two or more reading apparatus in combination with a copying-recording apparatus.

Also the number of recording means in the copying-recording apparatus is not limited to three but can be increased further or reduced to two.

It is furthermore possible to employ different functions, for example different recording densities or different recording colors, for the plural recording means of the copying-recording apparatus, and, in this manner the recording apparatus having such multiple functions can be shared by plural reading apparatus.

What I claim is:

1. An image recording system, comprising:
   a plurality of input means each for independently entering different image information into said system;
   a plurality of recording means each capable of recording, on a recording sheet, image information entered by any of said plurality of input means; and
   means for supplying image information entered by any of said plurality of input means selectively to at least one of said plurality of recording means; said supplying means further being operative, when a new recording requirement from at least one of said input means occurs during the recording operation of at least one of said plurality of recording means, for supplying image information entered from at least one of said input means to another recording means which is not then performing the image recording operation.

2. An image recording system according to claim 1, wherein said plurality of recording means are operable simultaneously to record different image information.

3. An image recording system according to claim 1, wherein each of said plurality of input means comprises a reader for photoelectrically reading an original image.

4. An image recording system according to claim 1, wherein each of said plurality of input means includes means for indicating an operating condition of each of said plurality of recording means.

5. An image recording system for recording image information on recording sheets, said system comprising:
   a plurality of input means each for entering image information into said system;
   a plurality of recording means each capable of recording image information, entered by said input means, on recording sheets; and
   means for detecting, during recording operation of all of said recording means, a new recording requirement and for designating at least one of said recording means to interrupt its current recording operation and fulfill the new recording requirement.

6. An image recording system according to claim 5, wherein all but said designated recording means operable to continue recording operation even if a new recording requirement is detected by said detecting means.

7. An image recording system according to claim 5, wherein said designated recording means is operative to resume the interrupted recording operation after fulfillment of the recording operation according to said new recording requirement.

8. An image recording system for recording image information on recording sheets, said system comprising:
   a plurality of input means each for entering image information into said system and for producing a demand for recording; and
   a plurality of recording means each for recording image information entered by an associated one of said input means on recording sheets in response to demand for recording by one of said input means; and
   means for controlling said plurality of recording means to interrupt recording by a first of said recording means of first image information input by a first of said input means and to cause a second of said recording means to record said first image information in response to a demand for recording from a second of said input means.

9. An image recording system according to claim 8, wherein the image information entered by said second said input means is recorded by said first of said recording means.

10. An image recording system according to claim 8, wherein, in response to said demand for recording from said second of said input means, the remainder of the recording operation of said first of said recording means is completed by said second of said recording means.

11. An image recording system according to claim 8, wherein said first and second of said recording means are adapted to simultaneously perform recording operation.

12. An image recording system according to claim 8, wherein the recording of the first image information from said first of said input means is interrupted if said second of said recording means is currently engaged in the recording of the image information entered from another of said input means at the time of said demand.

13. An image recording system for recording image information on recording sheets, said system comprising:
   recording means capable of recording image information on a recording sheet;
   a plurality of input means each for entering image information into said system for recording by said recording means; a plurality of storage means each for storing recording sheets recorded by said recording means, said plurality of storage means selectively storing recording sheets in accordance with the one of said input means through which image information recorded thereon is entered into said system; and
   control means for supplying image information to said recording means in response to demands for recording from said plural input means; said control means further interrupting image recording currently in progress by said recording means in response to a demand for recording from a designated one of said input means, and to supply image information from said designated one of input means to said recording means.

14. An image recording system according to claim 13, capable of communicating with external image reading means, and wherein said designated one of said input means comprises transmission means for transmitting image information from said external image reading means.

15. An image recording system according to claim 13, wherein said input means comprises reading means for photoelectrically reading an original document.

16. An image recording system according to claim 13, wherein said plural storage means are positioned in mutually superposed locations at an exit for recording sheets of said recording means.

17. An image recording system according to claim 13, further comprising means for changing a transport path for the recording sheets to said plurality of storage means in accordance with the one of said input means in use.

18. An image recording system comprising:
a first and a second input means each for independently entering different image information;
a plurality of recording means each capable of image recording on a recording sheet according to image information input by said plurality of input means; and
control means for detecting a requirement for recording image information entered by said second input means and, if all of said plurality of recording means are operating to record image information entered by said first input means, for causing all of said plurality of recording means to contribute to recording of image information entered by both said first and said second input means.

19. An image recording system according to claim 18, wherein said plurality of recording means are operable simultaneously to record different image information.

20. An image recording system according to claim 18, wherein said control means designates one of said plurality of recording means to record image information entered by said second input means.

21. An image recording system according to claim 18, wherein each of said plurality of input means comprises a reader for photoelectrically reading an original image.

* * * * *